United States Patent [19]

Yasuda et al.

[11] Patent Number: 4,624,406
[45] Date of Patent: Nov. 25, 1986

[54] OVERLAY WELDING METHOD

[75] Inventors: Koichi Yasuda, Chiba; Syozaburo Nakano, Mobara; Noboru Nishiyama, Ichihara, all of Japan

[73] Assignee: Kawasaki Steel Corporation, Kobe, Japan

[21] Appl. No.: 585,274

[22] PCT Filed: Jun. 29, 1983

[86] PCT No.: PCT/JP83/00206
§ 371 Date: Feb. 24, 1984
§ 102(e) Date: Feb. 24, 1984

[87] PCT Pub. No.: WO84/00122
PCT Pub. Date: Jan. 19, 1984

[30] Foreign Application Priority Data

Jun. 29, 1982 [JP] Japan ............ 57-110739

[51] Int. Cl.$^4$ .......... B23K 9/04; B23K 35/22
[52] U.S. Cl. .............. 228/263.15; 219/76.12; 220/456
[58] Field of Search ........ 228/263.15; 219/76.12, 219/76.14, 146.41; 220/3, 456

[56] References Cited

U.S. PATENT DOCUMENTS

| | | | |
|---|---|---|---|
| 3,066,215 | 11/1962 | Espy | 228/263.15 |
| 3,693,240 | 9/1972 | Jansson et al. | 228/263.15 |
| 3,693,245 | 9/1972 | de Cadenet | 228/263.15 |
| 4,136,814 | 1/1979 | Sarracino et al. | 228/263.15 |
| 4,224,360 | 9/1980 | Ohnishi et al. | 219/76.12 |

FOREIGN PATENT DOCUMENTS

| | | | |
|---|---|---|---|
| 15409 | 4/1971 | Japan | 219/76.12 |
| 72347 | of 1977 | Japan | . |
| 117850 | of 1977 | Japan | . |
| 71746 | 6/1979 | Japan | 219/76.12 |
| 71579 | 6/1981 | Japan | 219/76.12 |
| 2041810 | 9/1980 | United Kingdom | . |

Primary Examiner—Nicholas P. Godici
Assistant Examiner—Samuel M. Heinrich
Attorney, Agent, or Firm—Balogh, Osann, Kramer, Dvorak, Grnova & Traub

[57] ABSTRACT

An austenitic stainless steel welded metal layer having the given composition containing delta-ferrite phase is previously overlay welded as an intermediate layer prior to overlay welding of a surface layer of stainless steel, nickel alloy or the like on a base metal of carbon steel or low alloy steel. In the said composition, by making the ratio of Creq/Nieq to be more than 1.85, the disbonding is prevented and by making Creq to be less than 26% and the content of delta-ferrite phase to be less than 20%, the deterioration of flexural elongation is prevented. The present invention is applicable to the lining on an inner surface of a chemical reactor vessel, such as a desulfurizing reactor for petroleum-refining to be used under a high-temperature, high-pressure hydrogen environment.

1 Claim, 2 Drawing Figures

FIG_1

OVERLAY WELDING METHOD

TECHNICAL FIELD

The present invention relates to an overlay welding method and particularly to a method for forming a lining composed of an overlay welded metal on a surface of a base metal of carbon steel, low alloy steel or the like by an overlay welding in a chemical reactor vessel which is applied for handling a high-temperature, high-pressure hydrogen or vessels used for the similar application.

BACKGROUND ART

Such a lining is in most cases formed by overlay welding of stainless steel or nickel alloy on an inner surface of a desulfurizing reactor for petroleum-refining, which is used under a high-temperature, high-pressure hydrogen environment, in order to ensure the corrosion resistance.

During the operation under the above described environment, hydrogen is absorbed into a base metal of the vessel wall from the surface layer of the overlay welded metal (owing to the high temperature and high pressure) and is diffused through the base metal towards the outer wall surface of the vessel and it shows a stational distribution.

However, when the operation of such a reactor vessel is interrupted, that is in the case of shutdown, the separating cracks (referred to as "disbonding" hereinafter) may be caused at the welded metal side in the boundary portion of the base metal and the welded metal.

The cause of forming the disbonding has been considered as follows. Namely, when the temperature of the vessel is lowered due to the shutdown, both the hydrogen activity coefficients in the welded metal (austenite phase) and the base metal (ferrite phase) are increased but the increase in the base metal is more remarkable than that in the welded metal with respect to the temperature falling, so that the difference of both the activity coefficients is increased and hydrogen in the vessel wall reversely flows to the welded metal from the base metal and further the diffusion coefficient of hydrogen in the welded metal is smaller than that in the base metal, so that hydrogen abnormally accumulates at the welded metal side of the boundary portion of the welded metal and the base metal and this is on cause of the disbonding.

Regarding the metal structure of the boundary portion of the base metal and the welded metal, at the welded metal side, coarse austenite grains epitaxially grown with respect to the preaustenite grains at the base metal side are formed and further continuously a mixed phase of this austenite phase and the net-work formed delta-ferrite phase is formed. The above described disbonding is caused at the position corresponding to this coarse austenite grain boundary which is substantially parallel to the boundary. And, in this coarse austenite grain boundary carbides have been precipitated during the heat treatment after the overlay welding and therefore the precipitated carbides highly influence the disbonding together with the function of hydrogen accumulated during the shutdown in the operation.

Accordingly, this invention aims to provide a method for preventing the disbonding caused at the boundary between the base metal and the stainless steel overlay welded metal on an inner surface of a chemical reactor vessel in which a high-temperature, high-pressure hydrogen is handled, when the above described lining is applied.

In addition, this invention aims to provide a method for forming an overlay clad having excellent resistance to the above described disbonding and other excellent properties to be provided as the overlay welded metal, particularly high resistance to flexural elongation.

DISCLOSURE OF INVENTION

The present invention lies in an overlay welding method in which a surface layer of stainless steel, nickel alloy or the like is overlay welded on a base metal of carbon steel or low alloy steel, firstly characterized in that an austenitic stainless steel overlay welded metal having a ratio of chromium equivalent (Creq) given by the following equation to nickel equivalent (Nieq) given by the following equation being more than 1.85 and containing delta-ferrite phase, is previously overlay welded on the base metal as an intermediate layer and then the surface layer is overlay welded.

$Creq = \%Cr + \%Mo + 1.5 \times \%Si + 0.5 \times \%Nb$ $Nieq = \%Ni + 30 \times \%C + 0.5 \times \%Mn$ The above described coarse austenite grains are not formed at the welded metal side in the boundary portion between the base metal and the welded metal and therefore the disbonding can be effectively prevented.

The secondary characteristic of the present invention lies in that the chromium equivalent is less than 26% and the content of the delta-ferrite phase is less than 20% in the austenitic stainless steel overlay welded metal having a ratio of chromium equivalent (Creq) to nickel equivalent (Nieq) being more than 1.85 and having delta-ferrite phase. Thereby, in addition to the effect due to the first characteristic (disbonding resistance), the other performances to be provided as the welded metal of austenitic stainless steel, particularly the resistance to the hot cracking upon welding are high and the flexural elongation is excellent.

BEST MODE OF CARRYING OUT THE INVENTION

Figure 1:
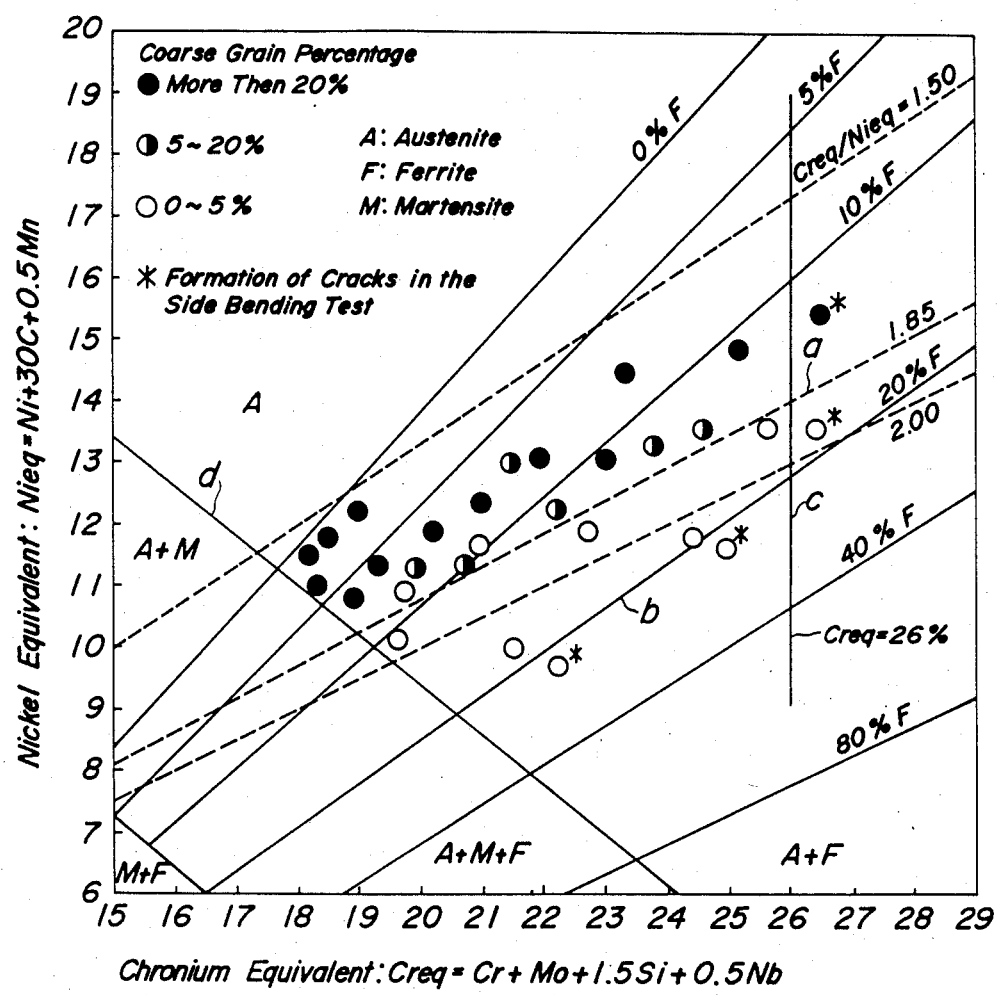
FIG. 1 is a graph showing the relation of the nominal chemical composition (Cr equivalent and Ni equivalent) of the welded metal to the structure at the welded metal side of the boundary portion of the base metal and the welded metal, wherein broken line a: a ratio of Creq/Nieq of the nominal chemical composition of the welded metal = 1.85,
solid line b: delta-ferrite in the welded metal = 20%,
solid line c: Creq of the nominal chemical composition of the welded metal = 26%,
solid line d: the boundary line of the austenite phase and the martensite phase in Schaeffler's phase diagram.

The present invention will be explained in more detail hereinafter.

Explanation will be made with respect to the first characteristic of the present invention.

When the overlay welding of austenitic stainless steel is carried out, it is generally necessary to contain more than a few % of delta-ferrite phase in order to prevent the hot cracking upon welding and since the present invention directs to the overlay welding on an inner surface of a pressure vessel and the like which are used under a high-temperature, high-pressure hydrogen environment, it is not desirable that the martensite phase having a high sensibility to hydrogen crack is contained in the welded metal. Therefore, the inventors have made studies in order to find out a first layer of stainless steel welded metal showing an effective mixed structure of austenite and delta-ferrite.

In general, the phase of the stainless steel welded metal can be fairly correctly known by Ni equivalent and Cr equivalent of the welded metal with reference to Schaeffler's phase diagram or Delong's phase diagram but the structure has not been studied. Even in the same chemical composition, the structure is different in the central portion and the boundary portion of the welded metal. Accordingly, the inventors have made investigation with respect to the relation of the structure in the vicinity of the boundary portion between the base metal and the welded metal which has a high relation to the disbonding, to Ni equivalent and Cr equivalent in the nominal chemical composition of the welded metal and as the results, it has been found that both the matters have a corelation.

TABLE 1

| | Steel | C | Si | Mn | P | S | Ni | Cr | Mo | Nb |
|---|---|---|---|---|---|---|---|---|---|---|
| Base metal | SA387 Gr22 | 0.141 | 0.24 | 0.50 | 0.011 | 0.004 | — | 2.32 | 0.98 | — |
| Electrode | 308L (0.4$^t$ × 150$^w$ mm) | 0.005 | 0.27 | 1.80 | 0.015 | 0.003 | 9.11 | 19.34 | 0.03 | — |
| | 308L (0.4$^t$ × 150$^w$ mm) | 0.005 | 0.12 | 1.99 | 0.015 | 0.003 | 9.96 | 20.33 | 0.03 | — |
| | 309L (0.4$^t$ × 150$^w$ mm) | 0.007 | 0.27 | 1.75 | 0.016 | 0.004 | 12.13 | 22.22 | 0.02 | — |
| | 309L (0.4$^t$ × 150$^w$ mm) | 0.014 | 0.23 | 1.96 | 0.015 | 0.003 | 14.91 | 23.83 | 0.03 | — |

In the overlay welding, by using a steel plate of SA387 Gr22 shown in Table 1 and combining four kinds of test electrodes of Type 308L and 309L with a flux in which metallic Cr and/or metallic Ni are mixed with $CaF_2$—$Al_2O_3$—$SiO_2$—$CaO$ fused type flux, a horizontal electroslag overlay welding was performed.

The welding condition was 2500 A, 28 V, 14 cm/min and after the welding, a heat treatment of 690° C. was performed for 28 hours and the structure in the vicinity of the boundary portion between the base metal and the welded metal was observed by an optical microscope to determine the coarse grain percentage.

The coarse grain percentage means a length of austenite grain boundary at the welded metal side which is parallel to the boundary between the base metal and the deposited metal/a length of the boundary.

Figure 2:
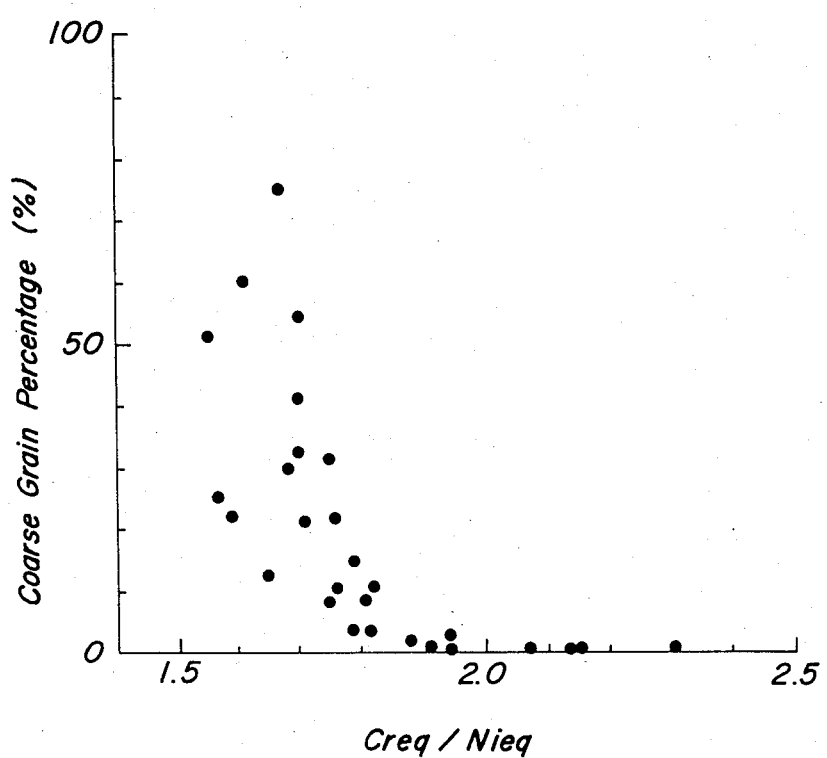
FIG. 2 is a graph showing the relation of Creq/Nieq of the nominal chemical composition of the welded metal to the coarse grain percentage.

The drawing in which this result is shown in Schaeffler's phase diagram, is FIG. 1. As seen from FIG. 1, when the ratio of Creq/Nieq of the nominal chemical composition of the welded metal is more than 1.85 (the broken line a in FIG. 1), the coarse grain percentage is less than 5% and in the observation of the structure, austenite coarse grains are not substantially found in the boundary portion between the base metal and the welded metal of this chemical composition. FIG. 2 shows the relation of the coarse grain percentage to the ratio of Creq/Nieq of the nominal chemical composition of the welded metal and this shows clearly the above described effect.

In order to examine the resistance to the disbonding due to hydrogen at a high temperature under a high pressure with respect to some samples having different coarse grain percentages in the overlay welded steel plates (5 samples having 0-5%, 5 samples of 5-20%, 4 samples of 20-50% and 4 samples of 50-75% in the coarse grain percentage), test pieces having a thickness of 45 mm (thickness of stainless overlay clad: 5 mm), a breadth of 55 mm and a length of 100 mm were prepared and these test pieces were exposed for 30 hours under the environment of hydrogen at 450° C. under 150 kg/cm$^2$ by using an autoclave and then cooled in air. One week after the cooling, the test pieces were subjected to an ultrasonic flaw detector from the base metal side to determine the disbonding. The obtained results are shown in the following Table 2. From this table, it can be seen that the disbonding is increased or becomes remarkable with increase of the coarse grain percentage and it has been confirmed that when the coarse grain percentage is 0-5%, no disbonding is caused and the high disbonding resistance is obtained.

TABLE 2

| Coarse grain percentage | Number of test pieces | No disbonding | Slight disbonding | Remarkable disbonding |
|---|---|---|---|---|
| 0-5% | 5 | 5 (100%) | 0 (0%) | 0 (0%) |
| 2-20% | 5 | 4 (80%) | 1 (20%) | 0 (0%) |
| 20-50% | 4 | 1 (25%) | 2 (50%) | 1 (25%) |
| 50-75% | 4 | 0 (0%) | 1 (25%) | 3 (75%) |

Thus, it has been found that regarding the austenitic stainless steel overlay welded metal containing delta-ferrite, the coarse grain percentage is reduced with increase of the ratio of Creq/Nieq of the nominal chemical composition of the welded metal, whereby the disbonding resistance is improved and that it is necessary for preventing the disbonding to make the above described ratio of Creq/Nieq to be more than 1.85 (the broken line a in FIG. 1).

Then explanation will be made with respect to the above described second characteristic.

As mentioned above, austenitic stainless steel overlay welded metal contains delta-ferrite phase but even though this phase prevents the hot cracking upon welding and serves to reduce the precipitation of chromium carbide at the austenite grain boundary, the phase is converted into $\sigma$ phase by being heated at 500°-900° C. for a long time and the precipitation of this phase noticeably deteriorates the performances of the welded metal. Furthermore, when the chromium equivalent in the welded metal is high, the precipitation of $\sigma$ phase is promoted and such a case is not preferable. However, from the results of the side bending test (t=9.5 mm, R=19 mm, 180° bending) before exposing to a high-temperature, high-pressure hydrogen, it has been found that as shown in FIG. 1, unless delta-ferrite is less than 20% (in FIG. 1, the solid line b) and the chromium equivalent is less than 26% (solid line c), the flexural elongation of the welded metal is deteriorated by the precipitation of $\sigma$ phase.

Detailed explanation has been made with respect to each characteristic of the present invention but the effects of the prevention of disbonding and the like will be explained with reference to the following examples.

A primary layer was formed on SA387 Gr22 steel plate base metal through a horizontal electroslag overlay welding by using a commercially available electrode of type 309L as a comparative example and using various test electrodes as examples of the present invention in combination with $CaF_2$—$Al_2O_3$—$SiO_2$—$CaO$ fused type flux (Comparative Example, Examples 1, 2, 3).

In addition, a primary layer was formed through a horizontal electroslag overlay welding by using a commercially available electrode of type 309L as an example of the present invention in combination with $CaF_2$—$Al_2O_3$—$SiO_2$—$MgO$ bonded type flux containing metallic chromium of 8% by weight. This shows an example wherein the chemical composition of the welded metal is controlled by the flux (Example 4). The chemical compositions of the base metal and the each electrodes are listed in the following Table 3.

A secondary layer was overlay welded on these overlay welded beads through a horizontal electroslag overlay welding by using type 347 electrode shown in Table 3. The welding condition is 2,500 A, 28 V, 14 cm/min and the heat treatment after the welding is 690° C. for 28 hours.

The nominal chemical compositions of the 1st layer welded metal of these overlay welds are shown in the following Table 4. The following Table 5 shows the results of the side bending test (t=9.5 mm, R=19 mm, 180° bending) and the disbonding test of these overlay welds. The disbonding test was performed with the ultrasonic test carried out one week after the exposure to a high-temperature, high-pressure hydrogen (450° C., 150 kg/cm², 30 hours, cooling in air) in the same manner as mentioned above.

high pressure and the high disbonding resistance can be attained.

As seen from the above described examples, even if the chemical composition of the welded metal is controlled by the chemical composition of the welding electrodes by using the given welding flux and welding condition or even if the chemical composition is controlled by adding alloy elements from the welding flux, the effect is not varied.

INDUSTRIAL APPLICABILITY

As seen from the above detailed explanation, the present invention can be applied to the case where a surface layer lining of stainless steel, nickel alloy or the like is applied on a base metal of carbon steel or low alloy steel through overlay welding, so that the present invention can be utilized for apparatuses having the combination of such base metals and lining materials, particularly for a chemical reactor vessel to be used under a high-temperature, high-pressure hydrogen environment, such as a desulfurizing reactor for petroleum-refining, or the lining of inner surfaces of vessels for similar applications.

We claim:

1. In an overlay welding method of the type including overlay welding a surface layer of stainless steel or nickel alloy on a base metal of carbon steel or low alloy steel, the improvement comprising previously overlay welding an austenitic stainless steel welded metal layer having a ratio of chromium equivalent (Creq), given by the following equation, to nickel equivalent (Nieq), given by the following equation, being more than 1.85, the chromium equivalent of less than 26%, and delta-

TABLE 3

| | Steel | C | Si | Mn | P | S | Ni | Cr | Mo | Nb |
|---|---|---|---|---|---|---|---|---|---|---|
| Base metal | SA387 Gr22 | 0.141 | 0.24 | 0.50 | 0.011 | 0.004 | — | 2.32 | 0.98 | — |
| Electrode | 309L | 0.005 | 0.36 | 1.88 | 0.022 | 0.001 | 12.24 | 22.21 | 0.005 | — |
| (0.4 × 150 mm) | 21Cr—9Ni | 0.004 | 0.32 | 1.72 | 0.019 | 0.001 | 9.60 | 21.65 | 0.005 | — |
| | 24Cr—11Ni | 0.004 | 0.28 | 1.82 | 0.018 | 0.001 | 11.35 | 24.32 | 0.005 | — |
| | 26Cr—12Ni | 0.005 | 0.34 | 1.85 | 0.020 | 0.001 | 12.32 | 26.49 | 0.005 | — |
| | 347 | 0.018 | 0.38 | 1.83 | 0.017 | 0.004 | 10.41 | 19.36 | 0.010 | 0.70 |

TABLE 4

| | Electrode | C | Si | Mn | P | S | Ni | Cr | Mo | Nb |
|---|---|---|---|---|---|---|---|---|---|---|
| Comparative Example | 309L | 0.031 | 0.61 | 1.50 | 0.023 | 0.002 | 10.62 | 19.33 | 0.005 | <0.003 |
| Example 1 | 21Cr—9Ni | 0.028 | 0.45 | 1.73 | 0.021 | 0.002 | 8.52 | 19.25 | 0.004 | <0.003 |
| Example 2 | 24Cr—11Ni | 0.030 | 0.42 | 1.66 | 0.020 | 0.002 | 10.02 | 21.55 | 0.005 | <0.003 |
| Example 3 | 26Cr—12Ni | 0.035 | 0.55 | 1.75 | 0.023 | 0.002 | 10.98 | 23.62 | 0.004 | <0.003 |
| Example 4 | 309L | 0.030 | 0.57 | 1.53 | 0.022 | 0.002 | 10.58 | 22.05 | 0.005 | <0.003 |

TABLE 5

| | Creq. | Nieq. | Creq./Nieq. | Phase (Schaeffler's phase diagram) | Side bending test | Disbonding test |
|---|---|---|---|---|---|---|
| Comparative Example | 20.25 | 12.30 | 1.65 | A + 6% F | Good | Remarkable disbonding |
| Example 1 | 19.93 | 10.23 | 1.95 | A + 12% F | Good | No disbonding |
| Example 2 | 22.19 | 11.75 | 1.89 | A + 13% F | Good | No disbonding |
| Example 3 | 24.45 | 12.91 | 1.89 | A + 16% F | Good | No disbonding |
| Example 4 | 22.91 | 12.25 | 1.87 | A + 15% F | Good | No disbonding |

As shown in Table 5, the overlay weldments according to the present invention are good in the flexural elongation and no disbonding is caused even under a severe hydrogen environment of high temperature and ferrite phase of less than 20%, and no martensite phase, on the base metal as an intermediate layer and then overlay welding the surface layer thereon:

Creq = %Cr + %Mo + 1.5 × %Si + 0.5 × %Nb
Nieq = %Ni + 30 × %C + 0.5 × %Mn.

* * * * *